United States Patent [19]
Kondo et al.

[11] Patent Number: 5,859,667
[45] Date of Patent: Jan. 12, 1999

[54] HIERARCHICAL ENCODING AND DECODING APPARATUS FOR A DIGITAL IMAGE SIGNAL

[75] Inventors: Tetsujiro Kondo; Yasuhiro Fujimori, both of Kanagawa; Takeharu Nishikata, Chiba, all of Japan

[73] Assignee: Sony Corporation, Tokyo, Japan

[21] Appl. No.: 704,310

[22] Filed: Oct. 15, 1996

Related U.S. Application Data

[63] Continuation of Ser. No. 313,811, Sep. 28, 1994, Pat. No. 5,598,214.

[30] Foreign Application Priority Data

Sep. 30, 1993 [JP] Japan .................................. 5-268050
Jul. 5, 1994 [JP] Japan .................................. 6-175971

[51] Int. Cl.$^6$ ............................................. H04N 7/46
[52] U.S. Cl. ........................ 348/414; 348/421; 348/424
[58] Field of Search .................................. 348/409, 410, 348/411, 412, 414, 417, 418, 421, 424; H04N 7/46

[56] References Cited

U.S. PATENT DOCUMENTS

| | | | |
|---|---|---|---|
| 4,864,396 | 9/1989 | Martens | 348/411 |
| 5,305,103 | 4/1994 | Golin | 348/424 |
| 5,331,414 | 7/1994 | Golin | 348/417 |
| 5,598,214 | 1/1997 | Kondo | 348/414 |

*Primary Examiner*—Howard W. Britton
*Attorney, Agent, or Firm*—Frommer Lawrence & Haug LLP; William S. Frommer

[57] ABSTRACT

In a hierarchical encoding apparatus, predictors each including a look-up table are used to form predicted signals for respective hierarchical levels. The difference between the predicted signal and the original signal forms the differential signal for the higher hierarchical levels. The look-up table contains either predictive coefficients which are used as weights for pixels of a signal in one hierarchical level to produce a signal at a higher hierarchical level, or representative values which are combined with a dynamic range and redundant component in a set of pixels of a signal in one hierarchical level to produce a signal at a higher hierarchical level. The values in the look-up table are obtained from representative images.

14 Claims, 9 Drawing Sheets

○ : FIRST HIERARCHICAL LEVEL
+ : SECOND HIERARCHICAL LEVEL
× : THIRD HIERARCHICAL LEVEL

HIERARCHICAL ENCODING AND DECODING APPARATUS FOR A DIGITAL IMAGE SIGNAL

CROSS-REFERENCE TO RELATED APPLICATION

This application is a continuation of the U.S. application Ser. No. 08/313,811, filed on Sept. 28, 1994, now U.S. Pat. No. 5,598,214.

BACKGROUND OF THE INVENTION

The present invention relates to apparatus for compressing and decompressing a digital image signal, and, more particularly, is directed to apparatus which hierarchically encodes the digital image signal into a plurality of signals that have different resolution levels, and corresponding decoding apparatus.

A hierarchical encoding technique that forms an image signal into a hierarchy of signals of decreasing resolution has been proposed. With this encoding technique, image signals in a plurality of hierarchical levels are transmitted through one transmission path, for example, one communication path or one recording/reproducing process. In addition to the resolution levels, such hierarchical encoding technique can be applied to image reduction.

Television monitors having different resolution reproduce the transmitted and encoded signals of the different hierarchical levels. For example, standard resolution video signals, high resolution video signals for high definition television sets, computer display image data, low resolution video signals for image databases that are retrieved at high speed have been employed.

FIG. 1 shows an example of the above-described hierarchical encoding apparatus, sometimes referred to as a pyramid encoding apparatus. In this example, image signals are encoded in four hierarchical levels. In the first hierarchical level, the number of pixels of an image signal is not reduced. In the second, third and fourth hierarchical levels, the number of pixels of the image signal is reduced by ¼, ¹⁄₁₆ and ¹⁄₆₄, respectively, relative to the number of pixels of the image signal in the first hierarchical level.

A digital image signal, referred to as an image signal in the first hierarchical level, is supplied to input terminal 1 of FIG. 1 which supplies the input image signal to thin-out filter 2 and subtractor 5.

The thin-out filter 2 selects certain pixels of the first hierarchical signal to form a second hierarchical signal, and supplies the second hierarchical signal to thin-out filter 3, subtractor 6, and interpolation filter 8.

The interpolation filter 8 interpolates the pixels of the second hierarchical signal to form an interpolated first hierarchical signal and supplies the interpolated first hierarchical signal to the subtractor 5.

The subtractor 5 subtracts, on a pixel by pixel basis, the interpolated first hierarchical signal from the original first hierarchical signal to produce a differential signal, and supplies the differential signal to an encoder 11.

The encoder 11 encodes the differential signal to produce an encoded first hierarchical level signal, and supplies the encoded first hierarchical level signal to output terminal 15.

Similarly, the thin-out filter 3 selects certain pixels of the second hierarchical signal to form a third hierarchical signal, and supplies the third hierarchical signal to thin-out filter 4, subtractor 7, and interpolation filter 9.

The interpolation filter 9 interpolates the pixels of the third hierarchical signal to form an interpolated second hierarchical signal and supplies the interpolated second hierarchical signal to the subtractor 6.

The subtractor 6 subtracts, on a pixel by pixel basis, the interpolated second hierarchical signal from the actual second hierarchical signal to produce a differential signal, and supplies the differential signal to an encoder 12.

The encoder 12 encodes the differential signal to produce an encoded second hierarchical level signal, and supplies the encoded second hierarchical level signal to output terminal 16.

The thin-out filter 4 selects certain pixels of the third hierarchical signal to form a fourth hierarchical signal, and supplies the fourth hierarchical signal to interpolation filter 10 and encoder 14.

The interpolation filter 10 interpolates the pixels of the fourth hierarchical signal to form an interpolated third hierarchical signal and supplies the interpolated third hierarchical signal to the subtractor 7.

The subtractor 7 subtracts, on a pixel by pixel basis, the interpolated third hierarchical signal from the actual third hierarchical signal to produce a differential signal, and supplies the differential signal to an encoder 13.

The encoder 13 encodes the differential signal to produce an encoded third hierarchical level signal, and supplies the encoded third hierarchical level signal to output terminal 17.

The encoder 14 encodes the fourth hierarchical signal to produce an encoded fourth hierarchical level signal, and supplies the encoded fourth hierarchical level signal to output terminal 18.

Each of the thin-out filters 2, 3, and 4 reduces the number of pixels horizontally and vertically by ½, that is, reduces the total number of pixels by ¼. Thus, the number of pixels of the image signal in the second, third and fourth hierarchical levels is ¼, ¹⁄₁₆ and ¹⁄₆₄, respectively, of the number of pixels of the image signal in the first hierarchical level.

Each of the interpolation filters 8, 9, and 10 interpolates pixels horizontally and vertically, that is, outputs an interpolation signal with pixels increased by a factor of 4 from the number of pixels of the input signal.

Each of the encoders 11, 12, and 13 compresses the data amount of the respective signal supplied thereto using adaptive quantizing techniques such as a linear quantizing technique, non-linear quantizing technique, differential pulse code modulation (DPCM), adaptive dynamic range coding (ADRC), or another compression technique.

FIG. 2 shows a hierarchical decoding apparatus corresponding to the above-described hierarchical encoding apparatus.

First, second, third, and fourth hierarchical level signals are supplied to input terminals 21, 22, 23, and 24, respectively, and thence to decoders 25, 26, 27, and 28, respectively. The decoders 25, 26, 27, 28 perform a complementary function relative to the encoders 11, 12, 13, 14, respectively.

The decoder 28 outputs a fourth hierarchical level image signal to an output terminal 38 and an interpolation filter 34. The interpolation filter 34 forms an interpolated third hierarchical level signal and supplies the interpolated third hierarchical level signal to adder 31.

The decoder 27 outputs a differential third hierarchical level signal to the adder 31, which adds the differential third hierarchical level signal and the interpolated third hierarchical level signal to form a third hierarchical level signal, and supplies the third hierarchical level signal to an output terminal 37 and an interpolation filter 33. The interpolation filter 33 forms an interpolated second hierarchical level signal and supplies the interpolated second hierarchical level signal to adder 30.

The decoder 26 outputs a differential second hierarchical level signal to the adder 30, which adds the differential second hierarchical level signal and the interpolated second hierarchical level signal to form a second hierarchical level signal, and supplies the second hierarchical level signal to an output terminal 36 and an interpolation filter 32. The interpolation filter 32 forms an interpolated first hierarchical level signal and supplies the interpolated first hierarchical level signal to adder 29.

The decoder 25 outputs a differential first hierarchical level signal to the adder 29, which adds the differential first hierarchical level signal and the interpolated first hierarchical level signal to form a first hierarchical level signal, and supplies the first hierarchical level signal to an output terminal 35.

In the above-described conventional hierarchical encoding apparatus, signals in lower hierarchical levels are interpolated to form signals in higher hierarchical levels by the interpolation filters 8, 9, and 10, and then used to form differential signals between respective original image signals and respective interpolation signals. However, the accuracy of the interpolation filters is not sufficiently high. Thus, the values of the differential signals become relatively large. After the differential signals are encoded, the amount of data to be transmitted is still too large.

OBJECTS AND SUMMARY OF THE INVENTION

Therefore, an object of the present invention is to provide an encoding apparatus and method which avoids the aforementioned disadvantages of the prior art.

Another object of the present invention is to provide a hierarchical encoding apparatus for a digital image signal which provides efficient encoding.

A further object of the present invention is to provide a hierarchical decoding apparatus for a signal encoded by the hierarchical encoding apparatus.

In accordance with an aspect of the present invention, a method and apparatus are provided for encoding a first digital image signal representing pixels and having a first resolution. The first digital image signal is formed into a second digital image signal having a second resolution lower than the first resolution, and reference pixels of the second digital image signal are processed to produce a class code. A predicted signal at the first resolution is produced from the reference pixels and the class code. The predicted signal is subtracted from the first digital image signal to produce a differential signal.

In accordance with another aspect of the present invention, a method and apparatus are provided for decoding first and second digital image signals having first and second resolutions, the first resolution being higher than the second resolution. Reference pixels of the second digital image signal are processed to produce a class code. A predicted signal at the first resolution is produced from the reference pixels and the class code and added to the first digital image signal to produce an output signal.

In accordance with a further aspect of the present invention, a method of generating predictive coefficients for a digital image signal is provided. Learning data representing an image is formed into blocks, and a class code is determined for each of the blocks. A selected pixel in each of the blocks having the same class code is defined as a prediction of other pixels in the block respectively multiplied by the predictive coefficients. Values are generated for the predictive coefficients which minimize the difference between the actual values of the selected pixel and the predicted values of the selected pixel in each of the blocks having the same class code, and the values for the predictive coefficients are associated with the respective class code.

In accordance with a still further aspect of the present invention, a method of generating representative values for a digital image signal is provided. Learning data representing an image is formed into blocks, and a class code is determined for each of the blocks. A redundant component is eliminated from a selected pixel of each of the blocks, and the redundancy eliminated selected pixel is normalized by a dynamic range of the respective block to produce respective sample values which are averaged for blocks having the same class code to produce a representative value. The representative value is associated with the respective class code.

The above, and other objects, features and advantages of the present invention will be apparent from the following detailed description of the preferred embodiments of the present invention when read in conjunction with the accompanying drawings in which corresponding parts are identified by the same reference numeral.

DESCRIPTION OF THE PREFERRED EMBODIMENTS

In a hierarchical encoding apparatus according to the present invention, instead of using an interpolation filter to form an interpolated signal, a predictor including a look-up table is used to form a predicted signal. The difference between the predicted signal and the original signal forms the differential signal for the higher hierarchical levels.

Since the predicted signal is more similar to the original signal than the interpolated signal, the values of the differential signals are smaller, resulting in more efficient data compression, that is, a smaller amount of compressed data.

Figure 3:
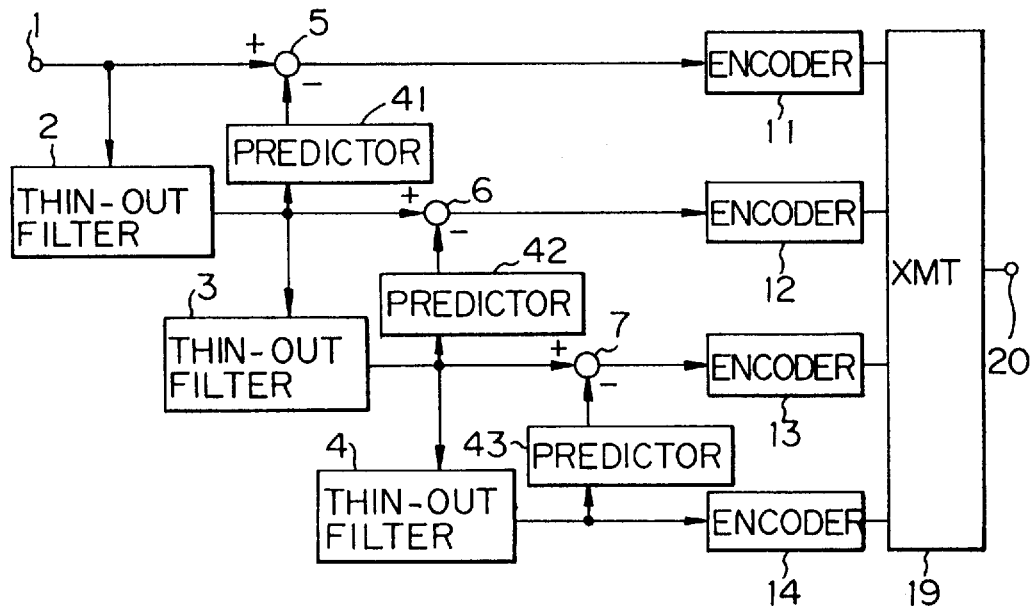
FIG. 3 is a block diagram showing an encoding apparatus according to the present invention.

FIG. 3 shows a hierarchical encoding apparatus according to the present invention, which encodes an input digital image signal in four hierarchical levels having relative resolutions of 1, ¼, ¹⁄₁₆ and ¹⁄₆₄.

The encoding apparatus of FIG. 3 comprises input terminal 1, thin-out filters 2, 3, 4, subtractors 5, 6, 7, encoders 11, 12, 13, 14, predictors 41, 42, 43, transmitter 19 and output terminal 20.

Figure 1:
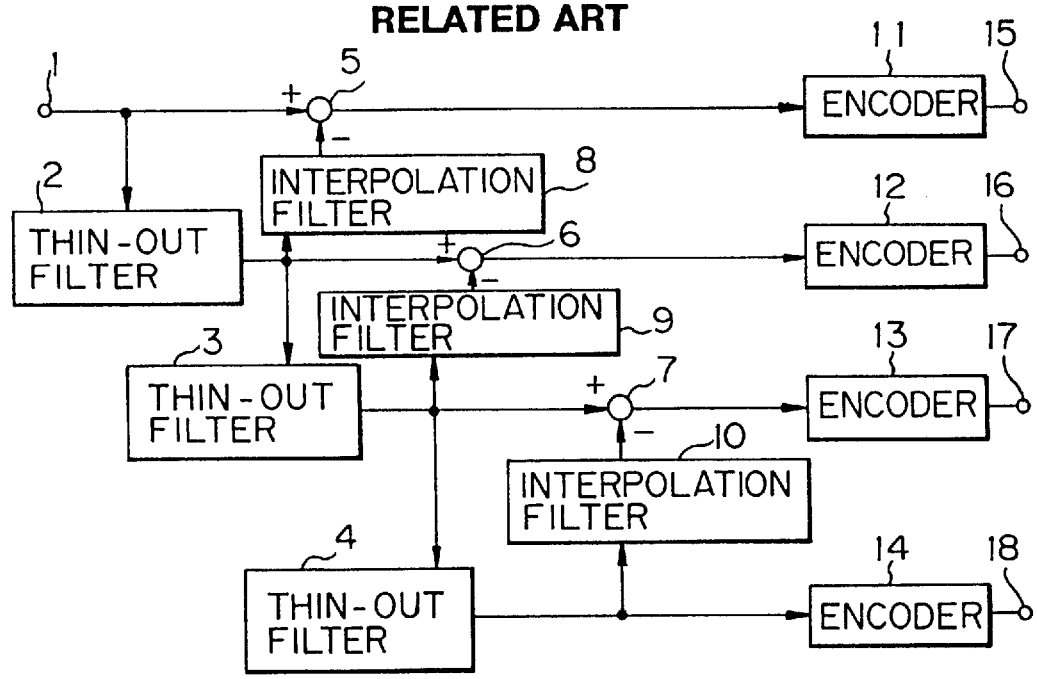
FIG. 1 is a block diagram showing a conventional hierarchical encoding apparatus.
Figure 2:
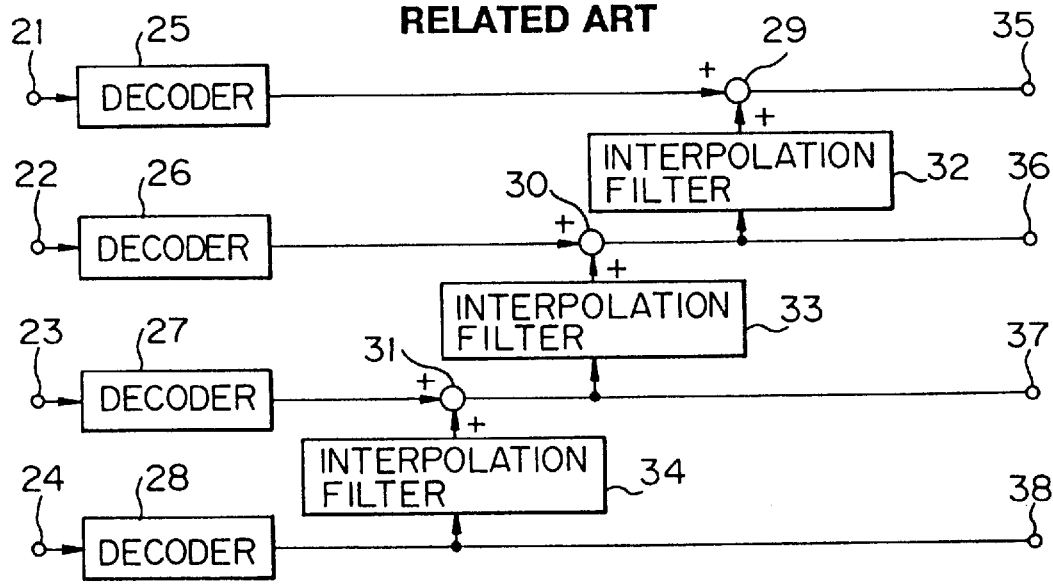
FIG. 2 is a block diagram showing a conventional hierarchical decoding apparatus.

A digital image signal such as a television signal or a signal reproduced by a VCR is supplied to input terminal 1. The thin-out filters 2, 3, 4, subtractors 5, 6, 7 and encoders 11, 12, 13, 14 generally function as described above with regard to FIG. 1, and, for brevity, a description thereof is omitted. Instead of interpolated signals as described with reference to FIG. 1, predicted signals (described in detail below) are used to form a difference signal in each of the higher hierarchical levels.

Transmitter 19 combines the encoded first through fourth hierarchical level signals and supplies them to output terminal 20, for transmission through a communication line or for recording on a recording medium or similar processing.

Figure 4:
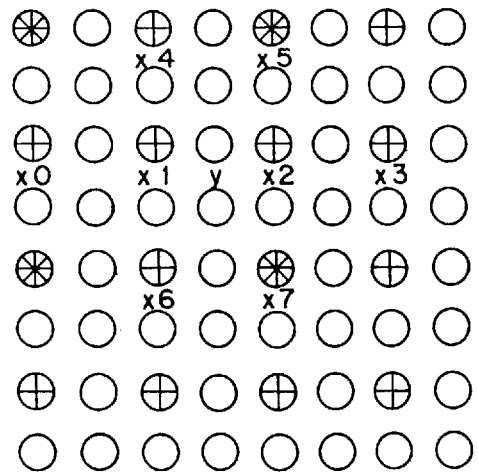
FIG. 4 is a diagram showing the relation of pixels in hierarchical levels and a predicted pixel.

FIG. 4 shows an arrangement of pixels. The pixels in the first hierarchical level are indicated by empty circles (○), the pixels in the second hierarchical level are indicated by circles containing a cross (+), and the pixels in the third hierarchical level are indicated by circles containing both a cross and an ex (×). The pixels in the fourth hierarchical level are not shown.

The number of pixels in the second hierarchical level is seen to be half of the number of pixels in the first hierarchical level in each of the vertical and horizontal directions. The number of pixels in the third hierarchical level is seen to be one-quarter of the number of pixels in the first hierarchical level in each of the vertical and horizontal directions. Similarly, although not shown, the number of pixels in the fourth hierarchical level is one-eighth of the number of pixels in the first hierarchical level in each of the vertical and horizontal directions.

Figure 5A:
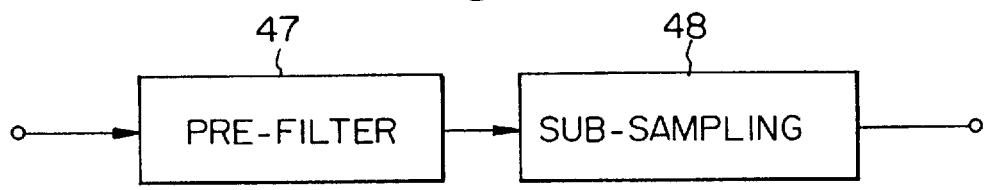
FIGS. 5A and 5B are block diagrams showing possible constructions of a thin-out filter.
Figure 5B:
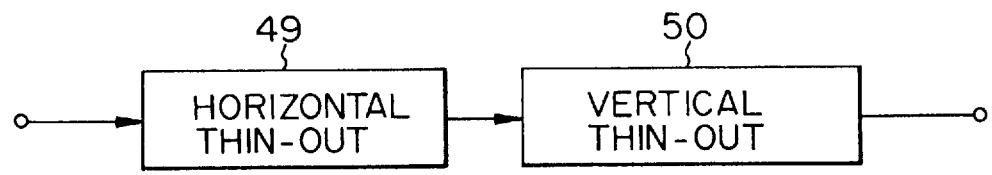

FIGS. 5A and 5B show possible constructions for each of the thin-out filters 2, 3, and 4 of FIG. 3.

In FIG. 5A, a band stop pre-filter 47 and a sampling circuit 48 are connected in series between an input terminal and an output terminal.

In FIG. 5B, a horizontal thin-out filter 49 and a vertical thin-out filter 50 are connected in series between the input and output terminals.

Figure 6:
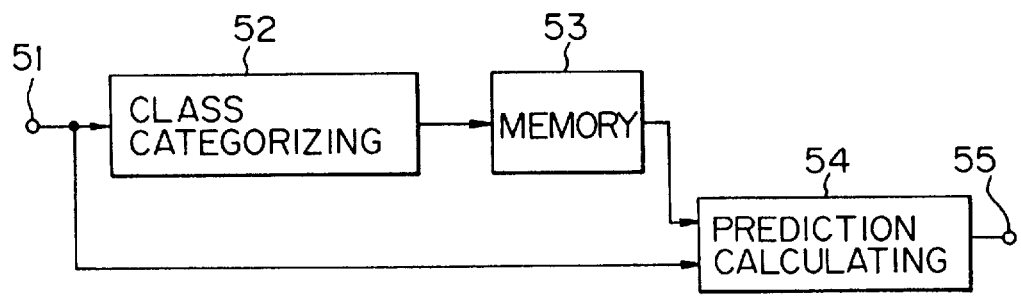
FIG. 6 is a block diagram showing a predictor used in the encoding apparatus of FIG. 3.

FIG. 6 shows a possible construction for each of the predictors 41, 42, 43 of FIG. 3. The predictors may operate using one of at least three techniques.

An input signal for a particular hierarchical level is supplied to input terminal 51, which is adapted to apply the input signal to class categorizing circuit 52 and prediction calculating circuit 54.

The class categorizing circuit 52 functions to determine a pattern, referred to herein as a class, of a two-dimensional signal level distribution of a plurality of pixels adjacent to a considered pixel in a higher hierarchical level, to generate a class code indicating the determined class, and to supply the class code to memory 53. The pixels in the distribution may be spatially and/or temporally adjacent. Determination of the class code is discussed in detail below.

Memory 53 is adapted to store a predetermined table, to read out the entry in its stored table which is located at the address indicated by the class code, and to supply the read out entry to the prediction calculating circuit 54. That is, the class code is used as an address for a lookup table stored in memory 53. The read out entry comprises at least one value.

Figure 10:
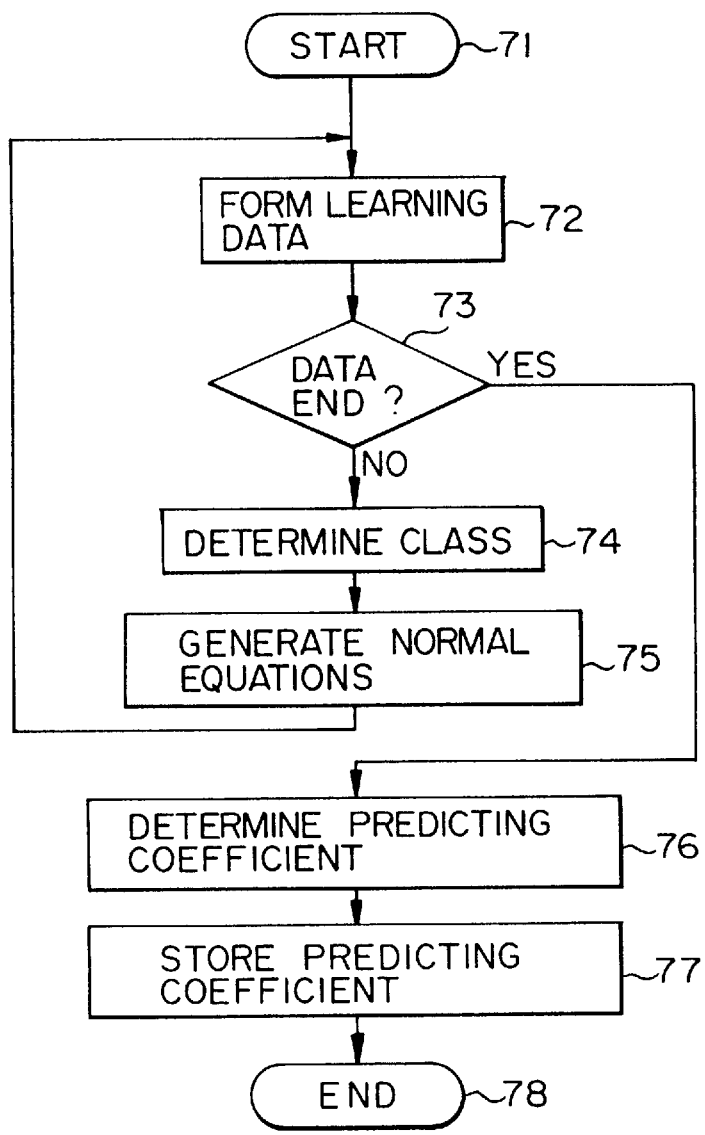
FIG. 10 is a flow chart showing a process for determining the optimum value of predicting coefficients stored in one embodiment of memory 53 of the predictor of FIG. 6.

In one embodiment, discussed below with reference to FIG. 10, the memory 53 stores a mapping table comprising a plurality of predicting coefficients w0, w1, . . . for each class. In another embodiment, discussed below with reference to FIG. 11, the memory 53 stores predicted values for each class. In yet another embodiment, the memory 53 stores representative values g(c) representing an optimum predicted pixel value for each class.

The prediction calculating circuit 54 is operative to linearly combine the plurality of pixels in the input signal from terminal 51 with the read out entry from the memory 53 to form a predicted value in another hierarchical level, such as a higher hierarchical level, and to supply the predicted value to output terminal 55.

In one technique, when the input signal comprises pixel values x0 . . . x3 adjacent to a pixel being predicted, and the memory 54 reads out predicting coefficients w0 . . . w3, the prediction calculating circuit 54 may generate a predicted value y' as follows:

$$y'=w0\cdot x0+w1\cdot x1+w2\cdot x2+w3\cdot x3$$

The circuit 54 also functions to select either the predicted value or the input data as output. That is, when the pixel to be predicted has the same position as one of the input pixels, the input pixel itself forms the predicted value.

In another technique, when the memory 53 reads out a predicted value, the prediction calculating circuit 54 functions to select either the read out predicted value or the value from terminal 51, and to supply the selected value to terminal 55.

In a further technique, when the input signal has a dynamic range DR and a redundant component BASE, also referred to herein as a base value BASE, and the memory 53 reads out a representative value g(c), the prediction calculating circuit 54 may generate a predicted value y' as follows:

$$y'=DR\cdot g(c)+BASE$$

The circuit 54 also functions to select either the predicted value or the input data for output.

The class categorizing process performed by the class categorizing circuit 52 will now be described.

As shown in FIG. 4, the level distribution, or values, of eight reference pixels (x0, x1, x2, x3, x4, x5, x6, and x7) adjacent to a pixel y being predicted are used to categorize the class of an image signal from the second hierarchical level which is being used to predict the pixel y in the first hierarchical level. It will be appreciated that other patterns of pixels surrounding the pixel to be predicted may also be used. The values of the eight bit reference pixels may be directly used. However, direct usage of the values of the reference pixels increases the required memory capacity.

To minimize the memory capacity required to categorize the class of the reference pixels of the input signal from terminal 51, the bits of the reference pixels may be compressed by, for example, adaptive dynamic range coding (ADRC). In the ADRC technique, the redundancy in a set of reference pixels is removed using the local correlation of the image so that the dynamic range of each block is substantially decreased.

In practice, a one bit ADRC technique may be used. The maximum and minimum values of a block of eight reference pixels are detected. The dynamic range, that is, the difference between the maximum value and the minimum value is obtained. The value of each of the reference pixels is divided by the dynamic range. The quotient is compared with "0.5". A quotient that is "0.5" or larger is encoded to "1". A quotient that is smaller than "0.5" is encoded to "0". The result is an eight-bit class code representing the eight reference pixels. Reference pixels that vary temporally (such as pixels contained in a forward frame and a backward frame) may be used.

An ADRC technique that generates a signal with other than one bit may be used. Alternatively, a compression encoding technique such as Differential Pulse Code Modulation (DPCM) or Block Truncation Coding (BTC) may be used.

Another technique for minimizing the memory capacity required to categorize the class of the reference pixels of the input signal from terminal 51 is a vector quantizing method.

Figure 7:
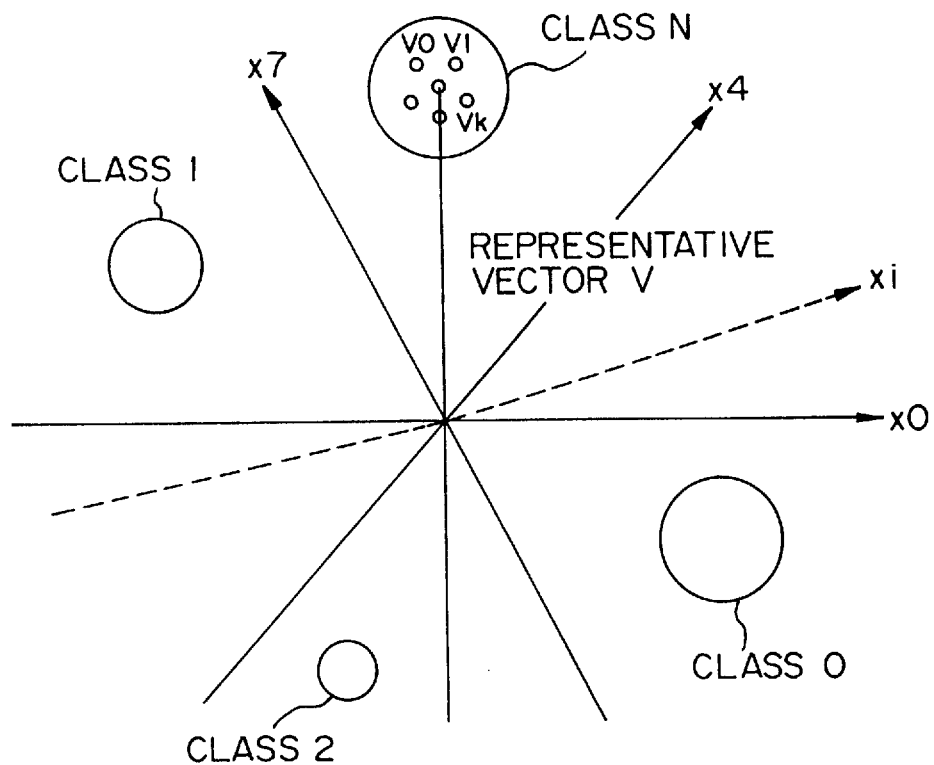
FIG. 7 is a diagram used in explaining the vector quantizing method of class categorizing.

As shown in FIG. 7, the reference pixels x0 . . . x7 input from terminal 51 may be considered as axes defining a Euclidean space with eight independent dimensions. In FIG. 7, only dimensions x0, xi, x4 and x7 are shown, for simplicity.

The region of the eight-dimensional vector produced from the input image data is not equally distributed, because the image data is locally correlated. Thus, a plurality of vectors that are spatially adjacent may be collected to form one class. FIG. 7 shows class 0, class 1, class 2, . . . class N, corresponding to the class code produced by the class categorizing circuit. The class N is seen to include vectors V0, V1, . . . Vk.

In the example of FIG. 7, representative vector V for the class N has been selected. A representative vector is determined for each class in a learning process based on block data for typical images, and stored in code book. Thus, when the eight-dimensional vector space is represented by a small number of classes, data can be compressed.

For example, when a block of nine pixels each represented by eight bits is categorized without compression, a total of $2^{72}$ bits is needed to represent all of the possible classes. However, using the above described vector quantizing technique, a suitable number of classes, such as 1024, may be represented using only $2^{10}$ bits. Thus, data compression is achieved so that a smaller memory can be used in the predictor.

Since the DC component portion of the pixels in a block is likely to be the same for each of the pixels, the compression efficiency in the vector quantizing method is preferably improved by subtracting the average value in each block and normalizing by the dynamic range of the block or the standard deviation of the eight-dimensional vector or a similar normalizing value.

Figure 8:
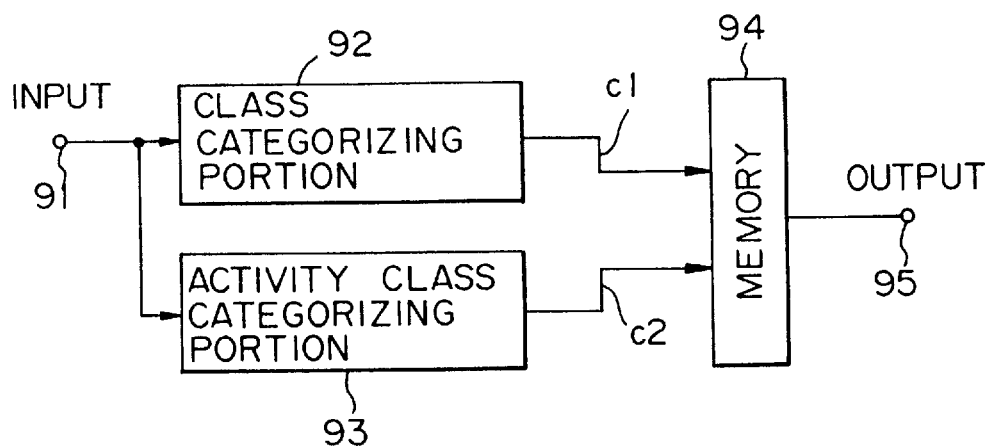
FIG. 8 is a block diagram of a class categorizing circuit using the vector quantizing method.

FIG. 8 shows a circuit construction which is suitable when the vector quantizing method is used for class categorizing, including input terminal 91, class categorizing circuit 92, activity class categorizing circuit 93, memory 94 and output terminal 95. A predictor could include the circuit shown in FIG. 8 instead of class categorizing circuit 52 and memory 53 shown in FIG. 6.

An input digital image signal is applied to input terminal 91, which is operative to supply the image signal to circuits 92 and 93.

The class categorizing circuit 92 is adapted to operate using the vector quantizing technique described above, including average value subtracting and normalizing, and to supply a class code c1 to memory 94.

The activity class categorizing circuit 93 is adapted to categorize the class of the image signal according to the activity for each block and to supply a class code c2 to memory 94. The activity may be, for example, the dynamic range of a block, the absolute value of the standard deviation of the pixels in a block, the absolute value of the difference between each of the pixels in a block and the average value of all of the pixels in the block, and so forth. Since the characteristics of an image may depend on the activities, use of the activities as parameters in the class categorizing process improves the precision and flexibility thereof.

The memory 94 is adapted to treat the class codes c1 and c2 as address data, and to read out at least one value stored in the address specified by the codes c1 and c2. The at least one read out value may be predicting coefficients, a predicted value or a normalized predicted value.

Figure 9:
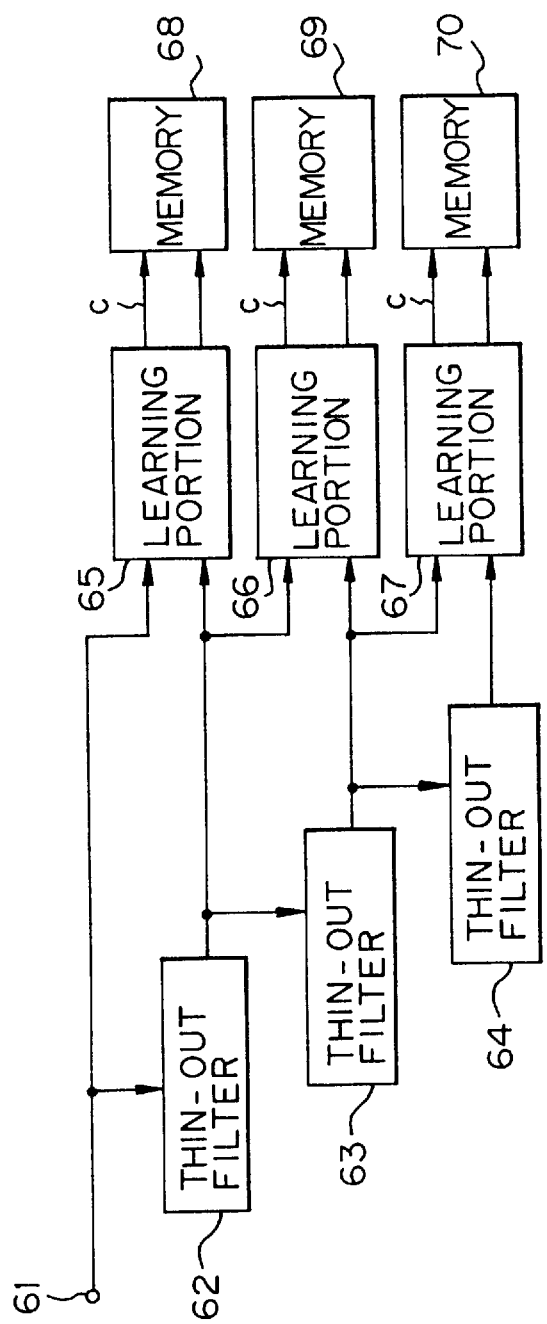
FIG. 9 is a block diagram of a circuit for generating the contents of the memory 53 of FIG. 6.

A circuit used for generating the contents of the memory in the predictor is shown in FIG. 9. The contents of the memory may be either predicting coefficients, predicted values or normalized predicted values.

The circuit of FIG. 9 comprises input terminal 61, thin-out filters 62, 63, 64, learning circuits 65, 66 and 67, and memories 68, 69, 70.

A digital image signal in the first hierarchical level is applied to input terminal 61, which supplies the first hierarchical level input signal to thin-out filter 62 and learning circuit 65. The thin-out filters 62, 63, 64 are adapted to generally operate in the manner described with respect to thin-out filters 2, 3, 4 of FIG. 1, to produce signals in the second, third and fourth hierarchical levels, respectively.

Figure 11:
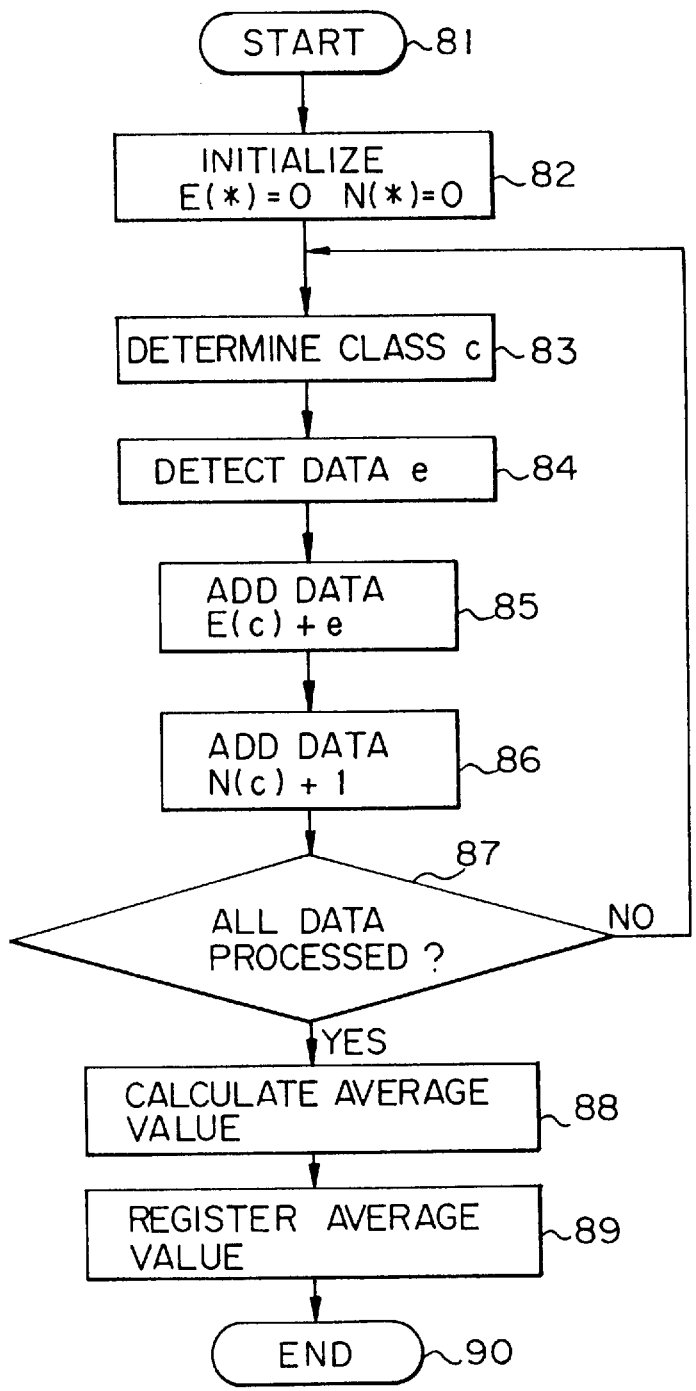
FIG. 11 is a flow chart showing a process for obtaining representative values stored in another embodiment of memory 53 of the predictor of FIG. 6.

The learning circuit 65 functions to receive the first and second hierarchical level signals, and to determine predicting coefficients, predicted values or normalized predicted values for use in predicting a signal in the first hierarchical level from a signal in the second hierarchical level in the manner described below with reference to FIGS. 10 and 11. The learning circuit 65 includes a class categorizing circuit for performing the same class categorizing operation performed by the class categorizing circuit 52 shown in FIG. 6. The learning circuit 65 supplies its results (predicting coefficients or predicted values or normalized predicted values) to memory 68 in association with a class code c.

Memory 68 is operative to store the results supplied from circuit 65 at the address indicated by the class code c supplied from circuit 65. For a predictor used to predict a first hierarchical level signal from a second hierarchical level signal, the contents of memory 68 are transferred to memory 53 of FIG. 6.

The learning circuits 66, 67 function in a similar manner as the learning circuit 65. The memories 69, 70 function in a similar manner as the memory 68 to contain tables used to predict a second hierarchical level signal from a third hierarchical level signal, and a third hierarchical level signal from a fourth hierarchical level signal, respectively.

A process for generating a mapping table of predicting coefficients for memory 53 will be described with reference to FIG. 10, which is a flow chart of this process. This process may be implemented in hardware and/or software.

Generally, learning data representing an image is formed into blocks, and a class code is determined for each of the blocks. A selected pixel in each of the blocks having the same class code is defined as a prediction of other pixels in the block respectively multiplied by the predictive coefficients. Values are generated for the predictive coefficients which minimize the difference between the actual values of the selected pixel and the predicted values of the selected pixel in each of the blocks having the same class code, and the values for the predictive coefficients are associated with the respective class code.

At step 71, a learning process is started.

At step 72, learning data corresponding to a known image is formed. At this step, if the dynamic range DR is smaller than a predetermined threshold value, this dynamic range DR is not used as learning data because it is significantly affected by noise.

At step 73, it is determined whether or not all input data of, for example, one frame or several frames showing typical scenes, has been processed. If input data remains to be processed, then at step 74 a pattern of a level distribution is determined corresponding to a compressed code of eight reference pixel values. At step 75, normal equations are generated, as described in detail below.

After all input data has been processed, at step 76, a predicting coefficient is determined, as described in detail below. At step 77, the predicting coefficient is stored in the memory.

At step 78, the learning process is completed.

The generation of normal equations in step 75 will now be described.

Assuming that the actual value of a pixel being predicted is y, the predicted value thereof is y', the actual values of the pixels adjacent to pixel y are x1 to xn, and the coefficients corresponding to classes are w1 to wn, then the estimated value y' is given by the following equation that is a linear combination of n taps:

$$y' = w1 \cdot x1 + w2 \cdot x2 + \ldots + wn \cdot xn$$

At the start of the learning process, the values w1 ... wn are undetermined.

The learning process is performed for each class. The number of pixels usable for the learning process is m, and is generally the number of pixels in the learning unit, such as a frame, excluding the number of pixels around the edge of the frame, and also excluding the pixels ignored due to their small dynamic range.

The pixels x 1 ... xn of the learning data for each of the m blocks of pixels (observation data) evaluated for a class should satisfy the equation X·W=Y. When m>n, the predicting coefficients w1 ... wn are not uniquely defined, leading to a residual equation X·W=Y+E, where E is an error vector having elements expressed by the following:

$$ej = yj - (w1 \cdot x1 + w2 \cdot x2 + \ldots + wn \cdot jn)$$

where j=1, 2, . . . , m. The residual equation may be alternatively expressed as:

$$\begin{bmatrix} x_{11} & x_{12} & \ldots & x_{1n} \\ x_{21} & x_{22} & \ldots & x_{2n} \\ \vdots & \vdots & & \vdots \\ x_{m1} & x_{m2} & \ldots & x_{mn} \end{bmatrix} \begin{bmatrix} w_1 \\ w_2 \\ \vdots \\ w_n \end{bmatrix} = \begin{bmatrix} y_1 \\ y_2 \\ \vdots \\ y_m \end{bmatrix} + \begin{bmatrix} e_1 \\ e_2 \\ \vdots \\ e_m \end{bmatrix}$$

Using the method of least squares, the optimum value of each predicting coefficient is obtained when the value of the squared error is zero:

$$0 = E^2 = \sum_{j=0}^{m} (e_j)^2$$

Taking the partial derivative of this equation with respect to the predicting coefficients:

$$0 = \frac{\partial E^2}{\partial w_i} = \sum_{j=0}^{m} 2\left(\frac{\partial e_j}{\partial w_i}\right) e_j$$

$$e_1 \frac{\partial e_1}{\partial w_i} + e_2 \frac{\partial e_2}{\partial w_i} + \ldots + e_m \frac{\partial e_m}{\partial w_i} = 0$$

$$(i = 1, 2, \ldots n)$$

The following are obtained from the residual equation:

$$\frac{\partial e_j}{\partial w_1} = x_{j1}, \frac{\partial e_j}{\partial w_2} = x_{j2}, \ldots \frac{\partial e_j}{\partial w_n} = x_{jn},$$

$$(j = 1, 2, \ldots m)$$

which can be expressed as:

$$\left(\sum_{j=1}^{m} e_j x_{j1} = 0\right), \left(\sum_{j=1}^{m} e_j x_{j2} = 0\right), \ldots \left(\sum_{j=1}^{m} e_j x_{jn} = 0\right)$$

From the above equations and the residual equation, the following simultaneous normal equations are obtained:

$$\left(\sum_{j=1}^{m} x_{j1} x_{j1}\right) w_1 + \left(\sum_{j=1}^{m} x_{j1} x_{j2}\right) w_2 + \ldots + \left(\sum_{j=1}^{m} x_{j1} x_{jn}\right) w_n = \left(\sum_{j=1}^{m} x_{j1} y_j\right)$$

$$\left(\sum_{j=1}^{m} x_{j2} x_{j1}\right) w_1 + \left(\sum_{j=1}^{m} x_{j2} x_{j2}\right) w_2 + \ldots + \left(\sum_{j=1}^{m} x_{j2} x_{jn}\right) w_n = \left(\sum_{j=1}^{m} x_{j2} y_j\right)$$

$$\vdots$$

$$\left(\sum_{j=1}^{m} x_{jn} x_{j1}\right) w_1 + \left(\sum_{j=1}^{m} x_{jn} x_{j2}\right) w_2 + \ldots + \left(\sum_{j=1}^{m} x_{jn} x_{jn}\right) w_n = \left(\sum_{j=1}^{m} x_{jn} y_j\right)$$

Determination of the predicting coefficients in step 76 will now be described.

Since the number of normal equations is equivalent to n unknown values, the optimum value of each predicting coefficient w1 ... wn can be obtained, such as by solving the simultaneous normal equations by the Gauss-Jordan elimination method. The predicting coefficients w1 . . . wn are stored in the memory at the address indicated by the class code.

A process for generating a mapping table of representative values (an optimum predicted value for each class) for memory 53 will be described with reference to FIG. 11, which is a flow chart of this process using a center of gravity method.

Generally, learning data representing an image is formed into blocks, and a class code is determined for each of the blocks. A redundant component is eliminated from a selected pixel of each of the blocks, that is, the selected pixel is the pixel to be predicted. The redundancy eliminated selected pixel is normalized by a dynamic range of the respective block to produce respective sample values which are averaged for blocks having the same class code to produce a representative value. The representative value is associated with the respective class code.

At step 81, the learning process is started.

At step 82, data arrays are initialized to a value of zero. The array $N(c_i)$ comprises the class number counters for classes $c_i$, that is, the number of blocks of learning data processed for this class. The array $E(c_i)$ comprises the learning data for this class. In step 82, an asterisk (*) indicates all classes.

At step 83, the class c of a selected pixel, namely, the pixel to be predicted during operation and which is known during the learning process, is determined from data adjacent to the selected pixel.

At step 84, the value e of the selected pixel is detected. In step 84, blocks having a dynamic range DR that is smaller than a predetermined threshold value are discarded.

At step 85, the value e obtained at step 84 is added to the previously obtained values E(c) for the class c determined at step 83.

At step 86, the class number counter N(c) is incremented by one.

At step 87, it is determined whether all pixels of the learning data have been processed. If pixels remain to be processed, the control flow returns to step 83 for processing of the next pixel.

When all pixels have been processed, that is, data tables E(*) have been obtained for all classes, the control flow advances to step 88.

At step 88, the average value for each class is obtained, that is, $E(c_i)/N(c_i)$ for each $c_i$. At step 89, the average value is stored at the address given by the class $c_i$.

At step 89, the learning process is completed.

Instead of obtaining predicted values as described above with reference to FIG. 11, normalized predicted values may be obtained. In this case, at step 84, instead of detecting the value e, a normalized predicted value (e−BASE)/DR is detected. The base value BASE is a common component in the level distribution of pixels in a block, for example, a minimum value MIN of a block, the level of a sampling point adjacent to a pixel to be predicted, an average value of pixels levels in a block or the like. The dynamic range DR is used to normalize the value e after the base value BASE has been eliminated. At step 88, the average value of the normalized predicted values $g(c_i)=E(c_i)/N(c_i)$ is obtained.

Figure 12:
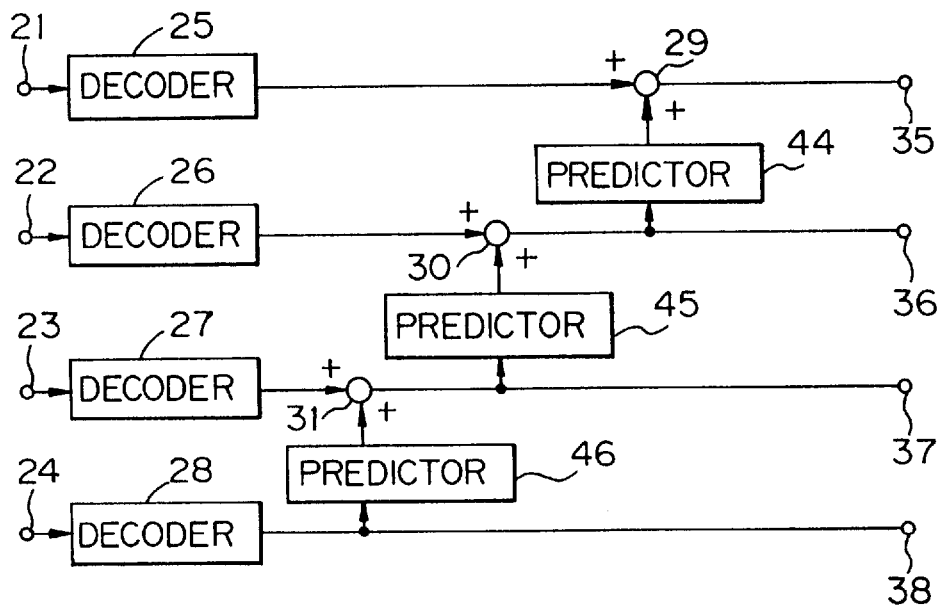
FIG. 12 is a block diagram showing a decoding apparatus according to the present invention.

FIG. 12 shows a hierarchical decoding apparatus according to the present invention. The hierarchical decoding apparatus decodes signals encoded by the above-described hierarchical encoding apparatus.

An image signal is encoded in the order from the lowest hierarchical level (the first hierarchical level) to the highest hierarchical level (the fourth hierarchical level), but image signals are decoded in the order from the highest hierarchical level (the fourth hierarchical level) to the lowest hierarchical level (the first hierarchical level).

The decoding apparatus of FIG. 12 comprises input terminal 21, 22, 23, 24, decoders 25, 26, 27, 28, predictors 44, 45, 46, and output terminals 35, 36, 37, 38.

Input signals in the first, second, third, and fourth hierarchical levels are supplied to input terminals 21, 22, 23, and 24, respectively, which supply the input signals to decoders 25, 26, 27, and 28, respectively.

The decoders 25, 26, 27, 28 correspond to the encoders 11, 12, 13, 14, respectively, shown in FIG. 3, and are adapted to function in a complementary manner.

Decoder 28 supplies an image signal in the fourth hierarchical level to an output terminal 38, and to predictor 46.

The predictor 46 is operative to predict an image signal in the third hierarchical level, and to supply the predicted signal to adder 31.

Decoder 27 supplies a decoded signal to the adder 31. The adder 31 is operative to add the decoded signal from decoder 27 and the predicted third hierarchical level signal to generate an image signal in the third hierarchical level, and to supply the third hierarchical level image signal to output terminal 37 and predictor 45.

The predictor 45 is operative to predict an image signal in the second hierarchical level, and to supply the predicted signal to adder 30.

Decoder 26 supplies a decoded signal to the adder 30. The adder 30 is operative to add the decoded signal from decoder 26 and the predicted second hierarchical level signal to generate an image signal in the second hierarchical level, and to supply the second hierarchical level image signal to output terminal 36 and predictor 44.

The predictor 44 is operative to predict an image signal in the first hierarchical level, and to supply the predicted signal to adder 29.

Decoder 25 supplies a decoded signal to the adder 29. The adder 29 is operative to add the decoded signal from decoder 25 and the predicted first hierarchical level signal to generate an image signal in the first hierarchical level, and to supply the first hierarchical level image signal to output terminal 35.

Another embodiment of the present invention will now be described.

In this embodiment, the number of hierarchical levels of signals to be transmitted is reduced, thereby significantly improving the compression efficiency. Encoding of intermediate hierarchical level is omitted, as these levels can be produced at the decoder based on the highest and lowest hierarchical levels.

Figure 13:
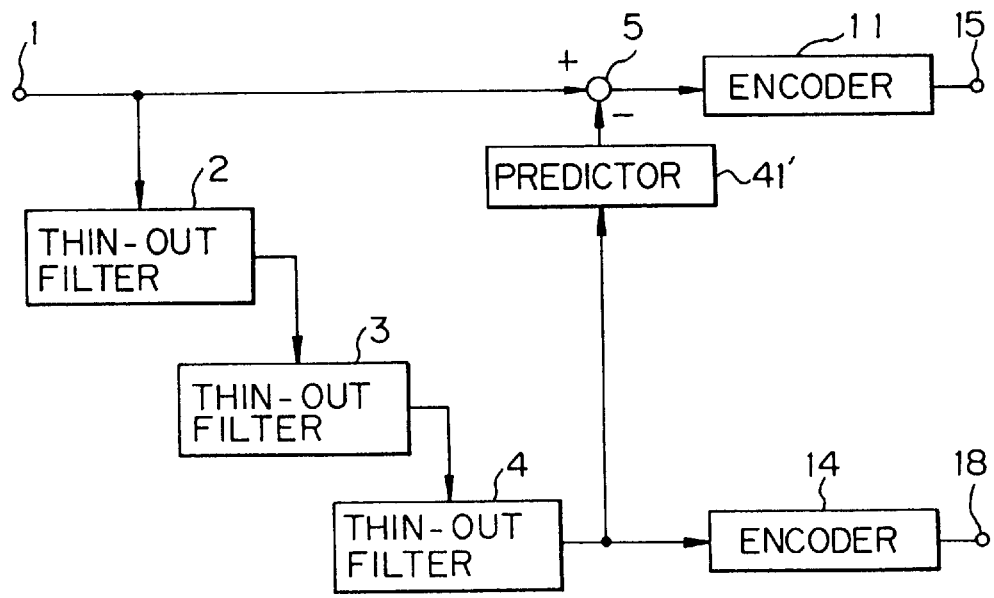
FIG. 13 is a block diagram showing another embodiment of an encoding apparatus according to the present invention.

FIG. 13 shows another embodiment of a hierarchical encoding apparatus according to the present invention. The encoder of FIG. 13 produces information in the first and fourth hierarchical levels, and does not produce information in the second and third hierarchical levels.

The encoding apparatus of FIG. 13 comprises input terminal 1, thin-out filters 2, 3, 4, subtractor 5, predictor 41', encoders 11, 14, and output terminals 15, 18.

A signal to be encoded is supplied to input terminal 1, which applies the input signal to thin-out filter 2 and subtractor 5.

The thin-out filter 2 is operative to thin out the input signal as described above, and to supply the thinned-out signal to thin-out filter 3, which functions in a comparable manner to supply a further thinned-out signal to thin out filter 4, which also functions in a comparable manner to supply an image signal in the fourth hierarchical level to predictor 41' and encoder 14.

The predictor 41' is adapted to predict an image signal in the first hierarchical level from the image signal in fourth hierarchical level and to supply a predicted first hierarchical level signal to subtractor 5. The predictor 41' includes a class categorizing circuit and a mapping table, as generally described above. The mapping table contains pre-learnt optimum predicting coefficients or representative values.

The subtractor 5 functions to subtract the predicted first hierarchical level signal from the input signal to produce a differential signal, and to supply the differential signal to an encoder 11.

The encoders 11 and 14 are adapted to encode the signals supplied thereto, as generally discussed above, to produce encoded signals in the first and fourth hierarchical levels, respectively, and to supply these signals to output terminals 15 and 18, respectively.

Figure 14:
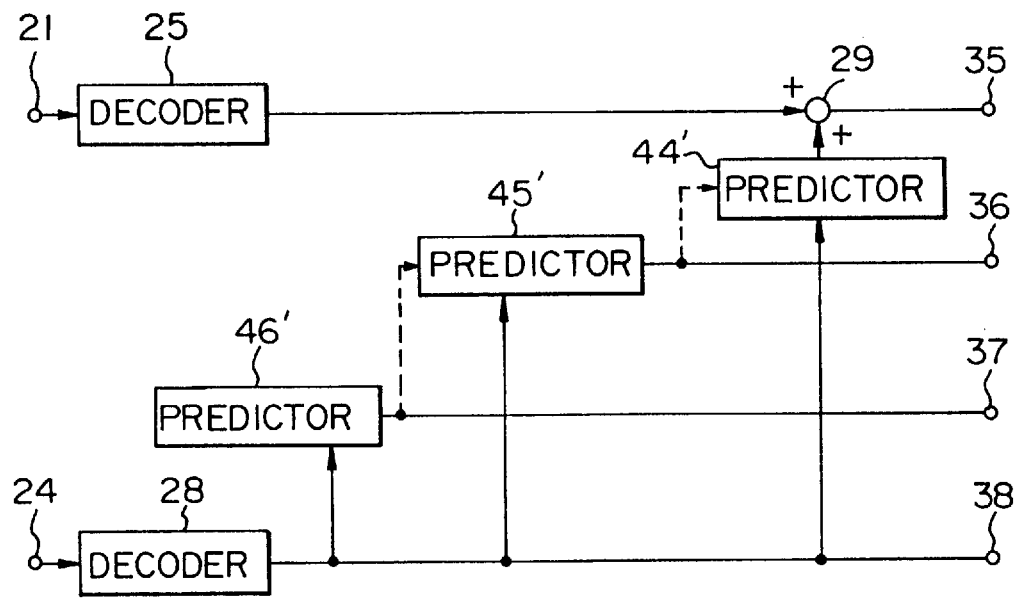
FIG. 14 is a block diagram showing another embodiment of a decoding apparatus according to the present invention.

FIG. 14 shows another embodiment of a hierarchical decoding apparatus according to the present invention. The decoder of FIG. 14 receives information in only the first and fourth hierarchical levels, and produces information in the first, second, third and fourth hierarchical levels. Since the decoder can produce information for hierarchical levels intermediate to the hierarchical levels of the received signals, highly efficient compression is achieved.

The decoding apparatus of FIG. 14 comprises input terminals 21, 24, decoders 25, 28, predictors 44', 45', 46', adder 29, and output terminals 35, 36, 37, 38.

An image signal in the fourth hierarchical level is supplied to terminal 24, which applies it to decoder 28. The decoder 28 functions to decode the signal applied thereto to produce an output image signal in the fourth hierarchical level, and to supply the fourth hierarchical level output image signal to predictors 44', 45', 46' and to output terminal 38.

The predictor 46' is operative to produce a predicted image signal in the third hierarchical level, and to supply the third hierarchical level image signal to predictor 45' and output terminal 37.

The predictor 45' is operative to produce a predicted image signal in the second hierarchical level, and to supply the second hierarchical level image signal to predictor 44' and output terminal 36.

The predictor 44' is operative to produce a predicted image signal in the first hierarchical level, and to supply the predicted first hierarchical level signal to adder 29.

Each of the predictors 44', 45', 46' contains a class categorizing circuit and a mapping table. The mapping table contains optimum predicting coefficients or representative values obtained as generally described above.

An image signal in the first hierarchical level is supplied to terminal 21, which applies it to decoder 25. The decoder 25 functions to decode the signal applied thereto to produce an decoded image signal, and to supply the decoded image signal to adder 29.

The adder 29 is adapted to add the decoded image signal from the decoder 25 and the predicted first hierarchical level signal to produce an output image signal in the first hierarchical level, and to supply the first hierarchical level output image signal to terminal 35.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An apparatus for encoding a first digital image signal having a first resolution, comprising:

first filtering means for filtering said first digital image signal to provide a second digital image signal having a second resolution which is lower than said first resolution;

second filtering means for filtering said second digital image signal to provide a third digital image signal having a third resolution which is lower than said second resolution;

predicting means, including class categorizing means, for processing reference pixels of said third digital image signal to produce a class code and to produce a predicted signal at said first resolution from said reference pixels and said class code; and means for subtracting said predicted signal from said first digital image signal to produce a differential signal.

2. An apparatus according to claim 1, further comprising means for encoding said differential signal to produce a compressed image signal.

3. An apparatus according to claim 1, further comprising means for encoding said third digital image signal to produce a compressed image signal.

4. An apparatus according to claim 1, wherein said reference pixels are adjacent in at least one of a spatial dimension and a temporal dimension.

5. An apparatus according to claim 1, wherein said class categorizing means is operable to compress said reference pixels to produce said class code.

6. An apparatus according to claim 1, further comprising means for transmitting said differential signal and said third digital image signal.

7. An apparatus according to claim 1, wherein said predicting means includes memory means for storing plural values and for reading out at least one value corresponding to said class code, and combining means for combining the at least one read out value and said reference pixels to generate said predicted signal.

8. An apparatus according to claim 7, wherein said memory means stores predictive coefficients, and said combining means multiplies the predictive coefficients read out from said memory means by said reference pixels and adds the product of the multiplications to produce a pixel of said predicted signal.

9. An apparatus for decoding a first digital image signal having a first resolution, said apparatus receiving said first digital image signal and at least one additional digital image signal having a second resolution which is lower than said first resolution, said apparatus comprising:

first predicting means including class categorizing means for processing said at least one additional digital image signal to produce a class code and to produce a first predicted signal having a resolution which is higher than said second resolution, said first predicted signal being produced from said at least one additional digital image signal and said class code;

second predicting means, including class categorizing means, for processing said first predicted signal to produce another class code and to produce a second predicted signal at said first resolution from said first predicted signal and said another class code; and means for adding said first digital image signal and said second predicted signal to produce a decoded output signal.

10. An apparatus according to claim 9, further comprising means for decoding at least two encoded digital image signals to respectively produce said first and at least one additional digital image signals.

11. An apparatus according to claim 9, wherein each of said predicting means includes memory means for storing plural values and for reading out at least one value corresponding to the respectively produced class code, and means for generating a respective one of said first and second predicted signals as a function of the at least one read out value.

12. An apparatus according to claim 9, further comprising means for receiving said first digital image signal and said at least one additional digital image signal transmitted thereto.

13. An apparatus according to claim 9, wherein said at least one additional digital image signal includes a plurality of reference pixels which are adjacent in at least one of a spatial dimension and a temporal dimension.

14. An apparatus according to claim 13, wherein the class categorizing means of each of said first and second predicting means is operable to compress said plurality of reference pixels to produce said respective class code.

* * * * *